United States Patent Office 2,782,233
Patented Feb. 19, 1957

2,782,233

BORIC TRIS-(FLUOROCARBOXYLIC) ANHYDRIDES

Earl L. Muetterties, Hockessin, Del., assignor to E. I. du Pont de Nemours and Company, Wilmington, Del., a corporation of Delaware No Drawing. Application March 11, 1955,
Serial No. 493,811

6 Claims. (Cl. 260—545)

This invention relates to a new class of organic compounds containing fluorine and boron. More particularly, this invention relates to new catalytic organic compounds containing fluorine and boron, to their preparation and to their use as polymerization catalysts.

Heretofore mixed anhydrides of boric acid and carboxylic acids have been prepared. However, these tris-(carboxylic)anhydrides, such as boric tris(acetic)anhydride, are inactive for the polymerization of vinylidene compounds and of cyclic ethers. Although a number of metal salts of fluorocarboxylic acids have been obtained, such as aluminum trifluoroacetate, no mixed anhydrides of boric acid and fluorocarboxylic acids have heretofore been known. Furthermore, aluminum trifluoroacetate does not catalyze the polymerization of cyclic ethers, such as tetrahydrofuran.

It is an object of this invention to provide a new class of organic compounds containing fluorine and boron. A further object is to provide new catalytic organic compounds containing fluorine and boron and a process for their preparation. A still further object is to provide new organic compounds of fluorine and boron which are useful as catalysts in the polymerization of vinylidene monomers and monomeric cyclic ethers. Another object is to provide a novel process for polymerizing at room and even lower temperatures vinylidene monomers and monomeric cyclic ethers by employing, as ionic catalysts, new organic compounds containing fluorine and boron. Other objects will appear hereinafter.

These and other objects of this invention are accomplished by providing a new class of compounds, the boric tris(fluorocarboxylic)anhydrides of the general formula

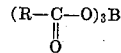

wherein R is a fluoroalkyl group in which all carbon atoms bear two fluorine atoms and the remaining atom attached to the terminal carbon atom is hydrogen or fluorine. More specifically, the new compounds of this invention have the general formula

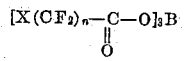

wherein X is hydrogen or fluorine and $n$ is an integer, preferably of from 1 to 20, inclusive. When X is hydrogen the formula is

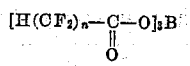

and when X is fluorine the formula is

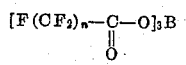

$n$ being an integer, preferably of 1 to 20.

The products of this invention are very active catalysts for ionic polymerization. Therefore, this invention also includes the improvement in the process of polymerizing vinylidene monomers and monomeric cyclic ethers by carrying out said polymerization in the presence, as ionic catalysts, of the mixed boric acid-fluoro-carboxylic acid anhydrides defined above.

The starting materials for the preparation of the boric tris(fluorocarboxylic)anhydrides [these compounds can also be called tris(fluoroacyloxy)borines] are boric anhydride (boric oxide, $B_2O_3$) and the appropriate fluorocarboxylic acids or, preferably, their anhydrides of the general formula $(R—CO)_2O$ wherein R is a fluoroalkyl group in which all carbon atoms bear two fluorine atoms and the remaining atom attached to the terminal carbon atom is hydrogen or fluorine. Fluorocarboxylic acids of the types $H(CF_2)_nCOOH$ or $F(CF_2)_nCOOH$, wherein $n$ is an integer, and their simple derivatives have been described in the chemical literature. For example, trifluoroacetic acid and its anhydride have been known for many years, as has difluoroacetic acid. Longer chain perfluoroalkanoic acids of the formula $F(CF_2)_nCOOH$, wherein $n$ is an integer, and their anhydrides are described in U. S. Patent 2,567,011, and longer chain fluoroalkanoic acids were all carbon atoms of the alkyl chain are completely fluorinated, with the exception of the terminal one, which bears one hydrogen atom, are described in U. S. Patent 2,559,629.

In practice, a convenient way of preparing the boric tris(fluorocarboxylic)anhydrides comprises reacting boric anhydride with a slight to moderate excess, e. g., a 10–100% excess over the calculated amount, of the appropriate fluorocarboxylic anhydride of the general formula $[X(CF_2)_nCO]_2O$ wherein X is hydrogen or fluorine and $n$ is an integer, preferably of 1 to 20. The reaction is preferably carried out at elevated temperatures, e. g., in the range 40–200° C. or even higher, and if desired at superatmospheric pressures in sealed vessels. The reaction is completed when the boric anhydride has dissolved in the fluorocarboxylic anhydride, although it can, of course, be interrupted before this stage is reached. The mixture is then filtered to remove any undissolved material, and the filtrate is concentrated to isolate the boric tris(fluorocarboxylic)anhydride. The latter separates, generally as an amorphous or poorly crystallized solid, which can be purified if desired by washing with appropriate non-solvents such as benzene, which of course must be unreactive toward the anhydride group. The boric tris(fluorocarboxylic)anhydrides can be obtained in better crystalline structure by recrystallization from a fluorocarboxylic anhydride, for example the one from which they are derived, or trifluoroacetic anhydride.

The boric tris(fluorocarboxylic)anhydrides are very sensitive to moisture, and they should be protected against it during preparation, purification and storage. They are also somewhat sensitive to heat in that, when heated in the dry state at or above their melting point, which is not sharp and perhaps is more accurately referred to as the decomposition point, they lose some of the fluorocarboxylic anhydride from which they are derived. There is thus obtained a mixture apparently consisting of the original boric tris(fluorocarboxylic)anhydride,

some of the pyroboric anhydride derivative,

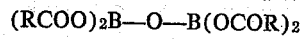

and some of the metaboric anhydride derivative,

The boric tris(fluorocarboxylic)anhydrides are strong acids in the terminology of G. N. Lewis, that is, they are strong electron acceptors. They possess the ability of catalyzing the polymerization of vinylidene monomers and cyclic ethers through the mechanism of cationic polymerization [for a discussion of ionic polymerization, see, for example, P. J. Flory's "Principles of Polymer Chemistry" (1953), pp. 217–228]. Any vinylidene monomer amenable to cationic polymerization can be polymerized when brought in contact with small amounts, e. g., 0.01 to 10% by weight, of a boric tris(fluorocarboxylic)anhydride. The polymerization proceeds at a high rate at room temperature of about 25° C. to temperatures considerably below room temperature, e. g., −50° C. or lower. Examples of vinylidene monomers susceptible to cationic polymerization include the alkyl vinyl ethers, isobutylene, propylene, 1,3-butadiene, styrene and alpha-methylstyrene. Similarly, cyclic ethers, e. g., ethylene oxide, tetrahydrofuran, pentamethylene oxide, allyl glycidyl ether and the like polymerize at low temperatures under the influence of catalytic amounts of the products of this invention. This was an entirely unexpected property since the fluorine-free boric tris(carboxylic)-anhydrides, e. g., boric tris(acetic)anhydride, have little or no Lewis acid character and are inactive for the polymerization of vinylidene compounds and of cyclic ethers. Similarly, the corresponding aluminum compounds, e. g., aluminum trifluoroacetate, are ineffective in the polymerization of cyclic ethers.

The invention is further illustrated by the following examples, in which parts are by weight.

Example I

A mixture of 14 parts of boric anhydride and 200 parts of trifluoroacetic anhydride, $(CF_3CO)_2O$, was heated under reflux to the boiling point of the trifluoroacetic anhydride (about 40° C.). The boric anhydride dissolved slowly and was completely in solution after five days at reflux temperature. The solution was then filtered, and the excess trifluoroacetic anhydride was evaporated slowly. The residual white solid was dried under very low pressure and at room temperature for seven hours. This material was boric tris(trifluoroacetic)anhydride [alternatively called tris(trifluoroacetoxy)-borine], $(CF_3COO)_3B$, as shown by its composition.

*Analysis.*—Calc'd for $C_6F_9O_6B$: C, 20.59; B, 3.10. Found: C, 18.91; B, 2.75.

This compound melted at 99° C., but the melting point was not sharp and appeared to be rather the decomposition temperature.

A sample of boric tris(trifluoroacetic)anhydride prepared as described above was recrystallized from trifluoroacetic anhydride, special care being taken to protect it from moisture and heat during the recrystallization and drying operations. The white crystalline solid so obtained had the same melting or decomposition point. It contained 19.21% carbon and 2.76% boron (theory, carbon 20.59%, boron 3.10%).

A sample of boric tris(trifluoroacetic)anhydride recrystallized from trifluoroacetic anhydride was sublimed at 100° C. under a pressure of less than 1 mm. of mercury. A white crystalline sublimate was obtained which melted, or decomposed, at about 105° C. This material was found by analysis to contain 17.55% carbon and 3.52% boron. These data indicate that, in the process of sublimation, some trifluoroacetic anhydride was lost and that the sublimate probably consisted of a mixture of compounds of the formula $(CF_3COO)_3B$, $(CF_3COO)_2B—O—B(OCOCF_3)_2$, and $CF_3COOBO$.

Boric tris(trifluoroacetic)anhydride was found to react with a number of organic substances. It dissolved in acetone with evolution of heat and, presumably, initial formation of a molecular addition product. However, this complex could not be isolated because the anhydride caused the condensation of the acetone to a polymeric material. With acetaldehyde, a complex was formed, which stoichiometric determinations indicated to contain 1.15 moles of $(CF_3COO)_3B$ per mole of acetaldehyde. With acetonitrile, a very weak complex formed which dissociated readily on heating. Hydrogen cyanide was absorbed by $(CF_3COO)_3B$ to give a weak molecular complex. At room temperature the dissociation pressure of hydrogen cyanide over this complex was quite high, and the composition of the solid complex at room temperature was about 0.28 mole of hydrogen cyanide per mole of anhydride. Trimethylamine reacted with considerable evolution of heat. Extensive secondary reactions occurred, and the molecular addition product was not isolated. Similarly, boric tris(trifluoroacetic)anhydride reacted exothermically with diethyl ether, but the etherate initially formed could not be isolated because of secondary reactions.

Example II

A mixture of 10 parts of boric anhydride and 200 parts of heptafluorobutyric anhydride, $(CF_3CF_2CF_2CO)_2O$, was heated at reflux temperature (about 106° C.) for 28 hours, during which time substantially all the boric anhydride dissolved. The reaction mixture was filtered while hot, and the filtrate was concentrated by evaporating the excess heptafluorobutyric anhydride under reduced pressure at room temperature. Boric tris(heptafluorobutyric)anhydride, or tris(heptafluorobutyryloxy)borine, $(CF_3CF_2CF_2COO)_3B$, was obtained as a white gummy solid which was washed with trifluoroacetic anhydride, benzene and carbon disulfide in that order, then dried under reduced pressure at room temperature.

*Analysis.*—Calc'd for $C_{12}F_{21}O_6B$: C, 22.15. Found: C, 18.20.

This product reacted with diethyl ether to give an addition complex in the same manner as the product of Example I.

Example III

A mixture of 3 parts of boric anhydride and 50 parts of difluoroacetic anhydride, $(HCF_2CO)_2O$, was heated in a pressure vessel at 60–65° C. for 4½ hours, after which time the boric anhydride had completely dissolved. The vessel was cooled and opened and the excess difluoroacetic anhydride was removed from the reaction product under reduced pressure. The remaining slurry was filtered, and the solid material was washed with benzene, then with carbon bisulfide, and dried under reduced pressure. Boric tris(difluoroacetic)anhydride or tris(difluoroacetoxy)borine, $(HCF_2COO)_3B$, was obtained as a light tan solid.

*Analysis.*—Calc'd for $C_6H_3F_6O_6B$: C, 24.35; H, 1.01; B, 3.65; F, 38.54. Found: C, 19.92; H, 1.22; B, 6.59; F, 30.35.

These figures suggest that the product had undergone appreciable thermal decomposition with loss of difluoroacetic anhydride and partial formation of the compound $OB(OCOCHF_2)$.

By substituting other appropriate fluorocarboxylic anhydrides for those shown in the above examples and using essentially the procedure described, other boric tris(fluorocarboxylic)anhydrides falling under the general formula given above are obtained. These include, for example, boric tris(tetrafluoropropionic)anhydride, $[H(CF_2)_2COO]_3B$; boric tris(pentafluoropropionic)anhydride, $[F(CF_2)_2COO]_3B$; boric tris(octafluoropentanoic)anhydride, $[H(CF_2)_4COO]_3B$; boric tris(undecafluorohexanoic)anhydride, $[F(CF_2)_5COO]_3B$; boric tris(dodecafluoroheptanoic)anhydride, $[H(CF_2)_6COO]_3B$; boric tris(hexadecafluorononanoic)anhydride, $$[H(CF_2)_8COO]_3B$$

boric tris(nonadecafluorodecanoic)anhydride, $$[F(CF_2)_9COO]_3B$$

boric tris(eicosafluoroundecanoic)anhydride, $$[H(CF_2)_{10}COO]_3B$$

boric tris(tetracosafluorotridecanoic)anhydride, $$[H(CF_2)_{12}COO]_3B$$

boric tris(dotriacontafluoroheptadecanoic)anhydride, $$[H(CF_2)_{16}COO]_3B$$

boric tris(tetracontrafluoroheneicosanoic)anhydride, $$[H(CF_2)_{20}COO]_3B$$

and the like which are obtained from the respective corresponding fluorocarboxylic acids or their anhydrides and boric anhydride. The preferred products, because of the greater availability of the fluorocarboxylic acids used as starting materials, are those of the formula $$[X—(CF_2)_n—COO]_3B$$

where X is hydrogen or fluorine and $n$ is an integer from 1 to 10, inclusive.

The following examples illustrate the use of the products of Examples I to III as catalysts in the ionic polymerization of vinylidene compounds and cyclic ethers.

Example IV

A stream of gaseous 1,3-butadiene was passed through a mixture of 15 parts of benzene and 0.4 part of boric tris(trifluoroacetic)anhydride at room temperature, about 25° C., for a period of five minutes, during which there was considerable heat evolution. After the passage of the butadiene had been discontinued, the reaction mixture was allowed to stand for 15 minutes until it cooled, then the benzene was removed under reduced pressure, leaving the polymerized 1,3-butadiene as a viscous oil insoluble in water.

Example V

Upon addition of 1 part of boric tris(trifluoroacetic) anhydride to 15 parts of isobutylene at —15° C., an exothermic reaction took place. The isobutylene was converted in a short time to a viscous polymer.

Example VI

When 1 part of boric tris(trifluoroacetic)anhydride was added to 25 parts of vinyl butyl ether at room temperature, about 25° C., polymerization took place immediately with attendant rise of the temperature to above 50° C. The vinyl butyl ether was converted in a short time to a viscous polymer.

Example VII

A mixture of 40 parts of tetrahydrofuran and one part of boric tris(trifluoroacetic)anhydride was allowed to stand at room temperature, about 25° C. After one and one-half hours, the tetrahydrofuran had polymerized to a viscous mass, and after fifteen hours it was essentially a solid polymer.

When, instead of boric tris(trifluoroacetic)anhydride, there was used its reaction product with diethyl ether, tetrahydrofuran was again polymerized, although more slowly. After three hours at room temperature, the tetrahydrofuran was converted to a viscous, oily polymer.

Example VIII

A mixture of 3 parts of pentamethylene oxide with about 0.2 part of boric tris(trifluoroacetic)anhydride polymerized in one-half hour at room temperature, about 25° C., to a gelatinous solid containing some clear liquid. The reaction product was treated with excess water to destroy the catalyst and dissolve its hydrolysis products, and the organic portion was extracted from the aqueous mixture with diethyl ether. Evaporation of the ether solution under reduced pressure left the polymerized pentamethylene oxide as a viscous oil.

Example IX

Addition of 0.5 part of boric tris(heptafluorobutyric)- anhydride to 10 parts of vinyl butyl ether at room temperature, about 25° C., caused an exothermic reaction leading in a few minutes to the formation of a highly viscous polymer of vinyl butyl ether.

Example X

Addition of 1 part of boric tris(heptafluorobutyric)- anhydride to 20 parts of tetrahydrofuran at room temperature, about 25° C., resulted in the polymerization of the tetrahydrofuran to an extremely viscous liquid in one hour. After three hours, the tetrahydrofuran had polymerized to a semi-solid mass.

Example XI

Upon addition of 1 part of boric tris(difluoroacetic)- anhydride to 15 parts of tetrahydrofuran, polymerization took place rapidly at room temperature of about 25° C., to give a thick, viscous mass. After two hours the polymerized tetrahydrofuran barely flowed at room temperature.

Among the chemical properties of the boric tris(fluorocarboxylic)anhydrides, the following are of particular interest. They react with alcohols to give esters of boric acid, with simultaneous formation of the fluorocarboxylic acid. They form molecular complexes with a number of organic compounds, including acetone, acetaldehyde, hydrogen cyanide, acetonitrile and trimethylamine, and especially with ethers such as diethyl ether. The latter complexes (etherates) share with the boric tris(fluorocarboxylic)anhydrides themselves the property of being active catalysts in the ionic polymerization of vinylidene compounds and cyclic ethers.

The polymers obtained with the help of boric tris(fluorocarboxylic)anhydrides as ionic catalysts are comparable in properties with the same polymers prepared with other catalysts, and can be put to the same generally known uses.

In addition to their utility as ionic polymerization catalysts, the boric tris(fluorocarboxylic)anhydrides are useful as herbicides. For example, preemergence tests with a typical representative, boric tris(heptafluorobutyric)anhydride, show that when it is applied at the rate of either 10 or 20 lb./acre to soil planted with representative noxious grasses, e. g., Johnson grass and Bermuda grass, there is observed in a four-week test considerable retardation of the growth of these grasses, this effect being comparable with that obtained with known preemergence herbicides such as trichloroacetic acid. There is also substantial, though less pronounced retardation of the growth of broad leaf plant such as mustard or carrot. The herbicidal activity of the products of this invention is further shown by their effect on the foliage of the usual test plants. When sprayed in 1% acetone solution on tomato plants and Johnson grass, boric tris(heptafluorobutyric)anhydride causes severe burning of the plants. Other boric tris(fluorocarboxylic)anhydrides show similar effects.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. Boric tris(fluorocarboxylic)anhydrides of the general formula $$(R—\underset{\underset{O}{\|}}{C}—O)_3B$$

wherein R is a fluoroalkyl group in which all carbon atoms bear two fluorine atoms and the remaining atom attached to the terminal carbon atom is selected from the class consisting of hydrogen and fluorine.

2. Boric tris(fluorocarboxylic)anhydrides of the general formula $$[H(CF_2)_n—\underset{\underset{O}{\|}}{C}—O]_3B$$

wherein $n$ is an integer from 1 to 20.

3. Boric tris(fluorocarboxylic)anhydrides of the general formula $$[F(CF_2)_n—\underset{\underset{O}{\|}}{C}—O]_3B$$

wherein $n$ is an integer from 1 to 20.

4. Boric tris(trifluoroacetic)anhydride having the formula $(CF_3COO)_3B$.

5. Boric tris(heptafluorobutyric)anhydride having the formula $(CF_3CF_2CF_2COO)_3B$.

6. Boric tris(difluoroacetic)anhydride having the formula $(HCF_2COO)_3B$.

References Cited in the file of this patent

UNITED STATES PATENTS

| | | |
|---|---|---|
| 1,987,558 | Hintermaier | Jan. 8, 1935 |
| 2,498,474 | Kern et al. | Feb. 21, 1950 |
| 2,553,677 | Rowland | May 22, 1951 |
| 2,628,253 | Dowdall | Feb. 10, 1953 |
| 2,634,291 | Arnold | Apr. 7, 1953 |